A. L. BAKER.
CULTIVATOR.
APPLICATION FILED JUNE 19, 1918.
1,285,551.
Patented Nov. 19, 1918.
2 SHEETS—SHEET 2.
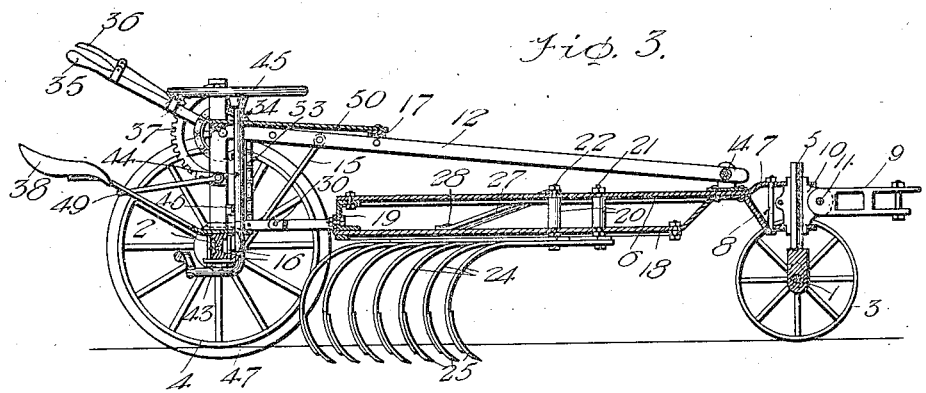
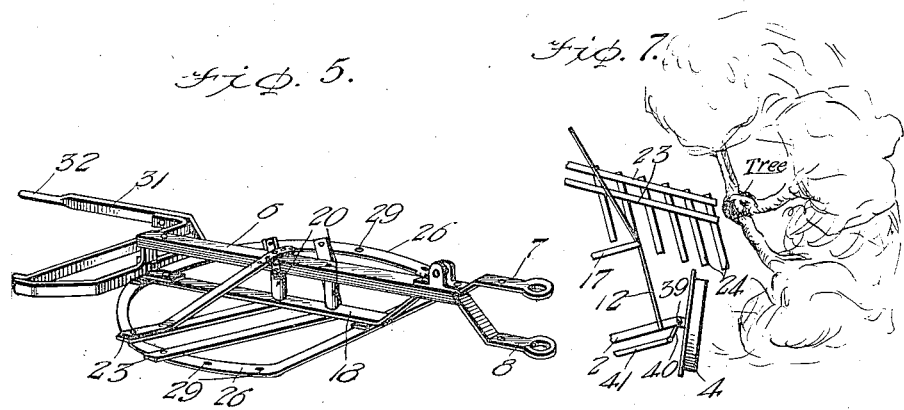
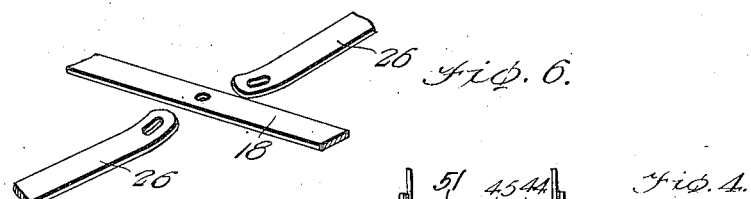
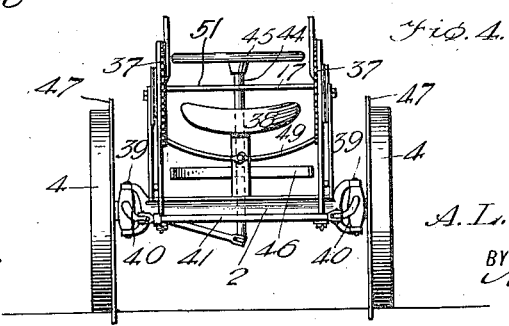
WITNESSES
INVENTOR
A. L. Baker,
BY
ATTORNEYS

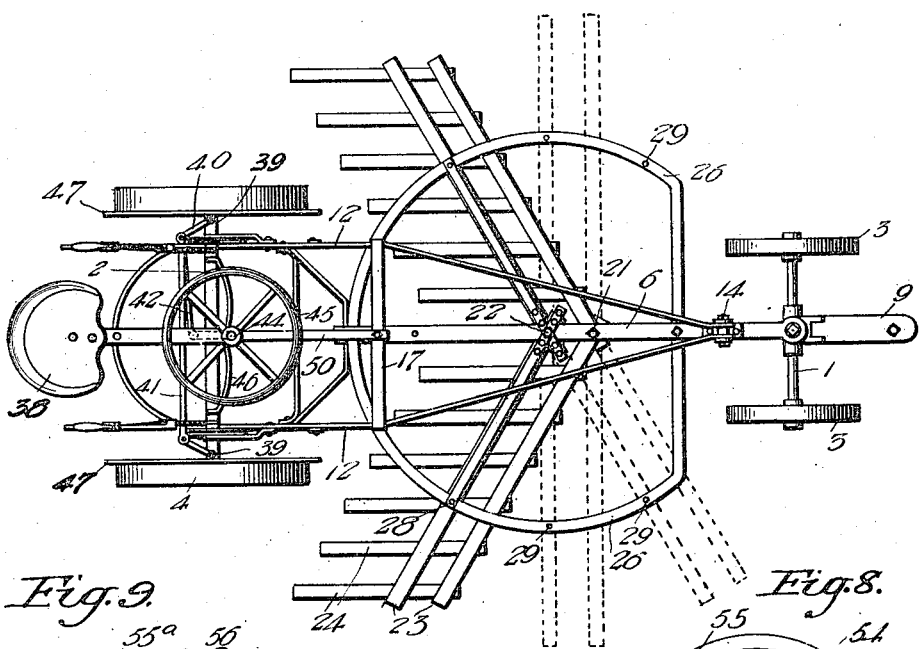

UNITED STATES PATENT OFFICE.

ALONZO L. BAKER, OF KERMAN, CALIFORNIA.

CULTIVATOR.

1,285,551.         Specification of Letters Patent.    Patented Nov. 19, 1918.

Application filed June 19, 1918.  Serial No. 240,848.

*To all whom it may concern:*

Be it known that I, ALONZO L. BAKER, a citizen of the United States, and a resident of Kerman, in the county of Fresno and State of California, have invented certain new and useful Improvements in Cultivators, of which the following is a specification.

My invention is an improvement in cultivators, and has for its object to provide a device of the character specified, adapted for all class of work, wherein a supporting frame is provided, carrying cultivating mechanism which is adjustable with respect to the frame both vertically and angularly, the said mechanism being sectional and the sections being capable of independent adjustment, and wherein means is provided for guiding the frame to permit the ground to be cultivated, as, for instance, close to a tree or vine, without the necessity for the draft animals to pass beneath the branches of the tree or vine.

In the drawings:

Figure 1 is a top plan view of the improved cultivator;

Fig. 2 is a side view;

Fig. 3 is a central longitudinal section;

Fig. 4 is a rear view;

Fig. 5 is a perspective view of the auxiliary frame;

Fig. 6 is a detail of the connections of the said frame;

Fig. 7 is a partial top plan view showing the manner of guiding the cultivating mechanism beneath the tree.

Fig. 8 is a top plan view of a modified arrangement of frames and plow beams.

Fig. 9 is a side view of one of the said beams.

In the present embodiment of the invention a suitable main frame is provided, the said frame being supported by a front axle 1 and a rear axle 2, and wheels 3 and 4 are journaled on the respective axles. A standard 5 is connected with the center of the front axle, and a plate 6 which forms a part of the auxiliary frame is connected with the standard, the said standard being polygonal in cross section as shown. The plate 6 at its forward end has upper and lower arms 7 and 8 which have openings for receiving the standard, and these openings are circular to permit the standard to turn in the bearings.

A short tongue 9 is pivoted to a bearing 10 mounted on the standard between the arms 7 and 8, the pivotal connection 11 of the tongue with the bearings being horizontal and transverse to the line of motion of the frame to permit the tongue to swing vertically. Suitable draft apparatus, as, for instance, a doubletree, may be connected with the tongue.

Angle plates, each consisting of a substantially horizontal portion 12 and a substantially vertical portion 13, are arranged between the rear axle and the auxiliary frame. The vertical portions 13 of these plates are secured to the axle near the ends thereof, and the substantially horizontal portions 12 extend forwardly and then converge to pivotal connection with the plate 6, as indicated at 14, the said connection being just behind the standard 5. The portions 12 of these plates are braced against the rear axle by braces 15, the said braces extending beneath the axle as shown in Fig. 3 and being secured to the axle by bolts and clip plates 16.

The portions 12 are also connected where they commence to converge by a crossplate 17. Thus the auxiliary frame may swing laterally with respect to the front axle and may swing vertically with respect to the main frame.

In addition to the plate 6 the cultivator frame has a second plate 18 arranged below the plate 6 in spaced relation, the said plate 18 carrying the arm 8 before mentioned. These plates are connected at their rear ends by a double angle connection 19, and intermediate their ends spacing sleeves or arbors 20 are arranged, the said sleeves encircling bolts 21 and 22 which pass through both plates. The cultivating mechanism shown in Fig. 1 is sectional, consisting of two units, one at each side of the cultivator frames. Each unit consists of a pair of plates 23 arranged in spaced parallel relation, and cultivator teeth 24 are connected with the plates, each tooth being secured to both plates, and each tooth carries a blade or plow point 25. These teeth are resilient, to permit the blades to yield to avoid breakage through striking obstructions. The cultivator frame carries also a species of ring, consisting of similar sections 26, each of which is approximately semi-circular but having a straight portion at its front end substantially perpendicular to the plate 6. These sections are movably connected to the plate 18 at their inner ends, the said sections being lapped beneath the plate and secured by bolts, as shown, at each end of the said section.

The openings in the ring sections for the bolts, as shown in Fig. 6, are elongated or slot-like, and the ends of the sections as well as that portion of the plate 18 where the sections are connected are rounded or curved, as shown more particularly in Fig. 6, to permit movement of the ring sections with respect to the plate, while at the same time permitting a tight joint. Thus the bars 23 which carry the cultivating mechanism, together with the ring sections to which they are connected, may swing upwardly or downwardly at their outer ends, to provide for plowing in a hollow, for instance, where the central portion of the plow is at the lowest part, or for plowing on a ridge, where the central portion of the plow is at the highest point. The ring sections and the bars 23 are held in adjusted position by means of braces 27. Each of these braces is connected at its outer end to the adjacent ring section, at the point where this section crosses the rearmost bar 23. The connection between the rearmost bar, the brace 27 and the ring section is a bolt and nut 28, the inner end of each brace being provided with a series of openings extending longitudinally of the brace, and one of these openings is adapted to be engaged by the bolt 22, to adjustably connect the brace to the plate 6. It will be evident that by engaging the bolt 22 with different openings, the inclination of the ring sections may be varied and may be held in adjusted position. The bars 23 being pivotally connected to the plate 18, may be swung into the positions shown in dotted lines in Fig. 1 if desired, that is, the bars 23 may be arranged in substantially V-shape, with the apex at the front, or the said bars may be arranged in alinement perpendicular to the bar 6, or either bar may be swung forwardly as indicated at the bottom of Fig. 1 in dotted lines, with the bars in alinement, but transverse to the plate 6.

The bars 23 are held in horizontally adjusted position by means of the bolts 28 which connect the rearmost bars to the ring sections. It will be noticed, referring to Fig. 1, that the ring sections have openings 29 for receiving these bolts, to hold the bars in adjusted position.

A substantially U-shaped member or yoke 30 is secured to the double angle plate 19 before mentioned, the body of the yoke being secured to the said plate while the arms extend rearwardly through vertical guides or passages at the portions 13 of the plates 12—13, and each arm of each yoke has a handle 32 at its rear end for convenience in manipulating the same. Flexible members 33, as, for instance, chains, are connected with these arms just in front of the portions 13 of the plates, and each chain passes at its upper end over a sprocket wheel 34 journaled at the angle of the portions 12—13 of the adjacent plate.

A lever 35 is secured to the axis of each sprocket wheel and each lever has latch mechanism 36 coöperating with a toothed quadrant 37 on the frame for holding the lever in adjusted position. Each lever is rigid with the adjacent wheel, and by means of the levers the rear end of the cultivator frame may be raised and lowered. A seat 38 is supported just behind the levers and in position to permit the driver to grasp the same, and steering mechanism for the rear wheels is arranged at the seat.

Each of the wheels 4 is journaled on a spindle which is pivoted to the end of the axle, as indicated at 39, on a vertical axis, to permit the spindle to swing with respect to the axle. Each spindle has rigid therewith a rearwardly extending arm 40, and these arms are connected by a link 41. A second link 42 connects one of the arms with a radial arm 43 on a steering shaft 44, journaled on the frame just in front of the axle. This shaft has a wheel 45 at its upper end and a foot plate 46 is arranged transversely of the steering shaft and rigidly secured thereto, in position to be engaged by the feet of the driver seated in the seat 38. By means of the foot plate the driver may swing the wheels or he may swing them by means of the steering wheel, as may be desired. Each wheel, as shown more particularly in Fig. 1, has an annular flange or rib 47 at its inner face, and these flanges or ribs, by their engagement with the ground, prevent skidding of the wheels, holding them in the course in which they are turned. Thus the driver may guide the main frame by means of the wheels 4, and since the flanges 47 prevent any lateral skidding or sliding of the wheels 4, it will be obvious that the cultivator teeth may be drawn up near to a tree or vine, for instance, while the draft team is lateral to the said tree or vine. Thus the ground beneath a tree may be cultivated close to the tree, without necessitating the passage of the team beneath the branches. This is a feature of importance, especially in trees having low foliage, as, for instance, fruit trees, vines and the like. With the guide mechanism specified the driver can throw the teeth as near to a tree or vine as may be desired.

The seat 38 before mentioned is connected by a spring plate 48 to the axle, and an arc shaped or curved brace 49 connects the plate with the portions 13 of the plates 12—13. The steering shaft 44 is supported at its upper end by a bearing plate 50 which extends rearwardly from the cross plate 17 before mentioned and by a cross bar 51 which connects the portions 13 of the plates 12—13.

In operation, the sections of the cultivator are adjusted to the position desired, as, for instance, the full line position of Fig. 1 or either of the dotted line positions. They are also adjusted as to the vertical angle, depending upon the character of the ground to be traversed. The driver also adjusts the vertical position of the cultivator blades, and the machine is ready for work. By means of the rear wheels he may guide the rear end to either side, carrying the cultivating mechanism with it, to follow the row exactly or to cultivate beneath a tree or vine.

In Figs. 6 and 7 is shown an attachment for converting the cultivator into a gang plow or gang cultivator. This attachment comprises a ring 52 and pairs of bars 53 mounted on the ring. These bars, as shown, are rigidly connected by the plow beams to be described, and the said bars are adjustably connected with the ring 52, the ring having openings 54 for receiving a bolt 55 which connects one of the bars 53 to the ring. By engaging these bolts 53 with different openings, it will be evident that the inclination of the bars 53 with respect to the ring may be varied. A series of beams is connected with the bars, each beam consisting of a portion 55$^a$ rigidly connected to the bars and a portion 56 which carries the plows 57. The portions 56 have vertical slots or passage ways whose plane is parallel with the long axis of the main frame of the machine, and the plow is connected to the said portions by means of a bolt which passes through an opening in the plow and through the slot and is engaged by a nut. The connection between the portions 55$^a$ and 56 of the beams is such that they may be adjusted with respect to each other to vary the depth at which the plows cut.

The portions 55$^a$ of the beam are square in cross section and they are rigidly secured to the bars 53. The upper end of each portion 56 is slotted to receive the portion 55$^a$, and each portion 56 is pivoted to the portion 55$^a$ as indicated at 58. The free end of each side of the split has a cross head 59 which is provided with a series of openings, as shown, and these openings are adapted to register with an opening extending transversely of the portion 53. By engaging the bolts with different openings in the cross heads it will be obvious that the inclination of the plow may be varied. In order to connect the attachment to the frame, the bars 23 and the ring sections 26 are detached, and are replaced by the ring 52. This ring carries the plows, and it will be obvious that by changing the angle of the bars 53 the position of the plows may be varied.

I claim:

1. A device of the character specified comprising front and rear wheel supported axles, the front axle having draft apparatus connected therewith, an auxiliary or cultivator supporting frame pivoted to the front axle on a vertical axis to swing laterally with respect to the axle, a main frame connected rigidly with the rear axle and pivoted to the auxiliary frame near the front axle on a transverse axis, said auxiliary frame having rearwardly extending rigid arms and the rear axle carrying vertical guides or passages through which the arms extend, means supported at the rear axle for raising and lowering the rear end of the auxiliary frame, ring sections arranged at each side of the auxiliary frame and adjustably connected therewith to tilt vertically, and cultivator supporting bars pivotally connected with the main frame at approximately the center of the ring formed by the ring sections and adjustably connected at their outer ends with the ring sections, said bars carrying cultivating mechanism.

2. A device of the character specified comprising front and rear wheel supported axles, the front axle having draft apparatus connected therewith, an auxiliary or cultivator supporting frame pivoted to the front axle on a vertical axis to swing laterally with respect to the axle, and a main frame connected rigidly with the rear axle and pivoted to the auxiliary frame near the front axle on a transverse axis, said auxiliary frame having rearwardly extending rigid arms and the rear axle carrying vertical guides or passages through which the arms extend.

3. A device of the character specified comprising front and rear wheel supported axles, the front axle having draft apparatus connected therewith, an auxiliary or cultivator supporting frame pivoted to the front axle to swing laterally with respect thereto, a main frame rigidly connected with the rear axle and pivoted to the auxiliary frame near the front axle to permit the auxiliary frame to swing transversely with respect to the main frame, said auxiliary frame having rearwardly extending rigid arms and the rear axle carrying vertical guides or passages through which the arms extend, means on the main frame for raising and lowering the rear end of the auxiliary frame, cultivator supporting bars pivotally connected with the main frame at each side thereof to swing with respect thereto, means for making said bars rigid with respect to the main frame in adjusted position, the bars carrying cultivator mechanism, said bars at each side being movable vertically at their outer ends with respect to the cultivator frame, and means for holding the bars in adjusted position.

4. A device of the character specified comprising front and rear wheel supported axles, the front axle having draft apparatus connected therewith, an auxiliary or cultivator supporting frame pivoted to the rear axle to swing laterally with respect thereto, a main frame rigidly connected with the rear axle and pivoted to the auxiliary frame near the front axle to permit the auxiliary frame to swing transversely with respect to the main frame, said auxiliary frame having rearwardly extending rigid arms and the rear axle carrying vertical guides or passages through which the arms extend, means on the main frame for raising and lowering the rear end of the auxiliary frame, cultivator supporting bars pivotally connected with the main frame at each side thereof to swing with respect thereto, and means for making said bars rigid with respect to the main frame in adjusted position, the bars carrying cultivator mechanism.

5. A device of the character specified comprising front and rear wheel supported axles, the front axle having draft apparatus connected therewith, an auxiliary or cultivator supporting frame pivoted to the front axle to swing laterally with respect thereto, a main frame rigidly connected with the rear axle and pivoted to the auxiliary frame near the front axle to permit the auxiliary frame to swing vertically with respect to the main frame, said auxiliary frame having rearwardly extending rigid arms and the rear axle carrying vertical guides or passages through which the arms extend, means on the main frame for raising and lowering the rear end of the auxiliary frame, and cultivator supporting means extending laterally from each side of the cultivator frame and adjustable with respect thereto.

6. A device of the character specified comprising front and rear wheel supported axles, the front axle having draft apparatus connected therewith, an auxiliary or cultivator supporting frame pivoted to the front axle to swing laterally with respect thereto, a main frame rigidly connected with the rear axle and pivoted to the auxiliary frame near the front axle to permit the auxiliary frame to swing vertically with respect to the main frame, said auxiliary frame having rearwardly extending rigid arms and the rear axle carrying vertical guides or passages through which the arms extend, and means on the main frame for raising and lowering the rear end of the auxiliary frame.

7. A device of the character specified comprising a main frame carrying rear wheels, an auxiliary cultivator supporting frame arranged beneath the front end of the main frame and pivoted thereto to swing vertically, a wheel supported front axle to which the front end of the auxiliary frame is pivoted to swing laterally, draft mechanism connected with the front axle, means in connection with the cultivator supporting frame and the main frame for preventing lateral swinging movement of the auxiliary frame with respect to the main frame, means for raising and lowering the rear end of the auxiliary frame, a cultivating unit supported at each side of the auxiliary frame and mounted to swing laterally on the said frame, means for holding each unit in adjusted position, each unit being mounted to swing vertically with respect to the auxiliary frame, and means for holding each unit in adjusted position.

8. A device of the character specified comprising a main frame carrying rear wheels, an auxiliary cultivator supporting frame arranged beneath the front end of the main frame and pivoted thereto to swing vertically, a wheel supported front axle to which the front end of the auxiliary frame is pivoted to swing laterally, draft mechanism connected with the front axle, means in connection with the cultivator supporting frame and the main frame for preventing lateral swinging movement of the auxiliary frame with respect to the main frame, means for raising and lowering the rear end of the auxiliary frame, a cultivating unit supported at each side of the auxiliary frame and mounted to swing laterally on the said frame, and means for holding each unit in adjusted position.

9. A device of the character specified comprising a main frame carrying rear wheels, an auxiliary cultivator supporting frame arranged beneath the front end of the main frame and pivoted thereto to swing vertically, a wheel supported front axle to which the front end of the auxiliary frame is pivoted to swing laterally, draft mechanism connected with the front axle, means in connection with the cultivator supporting frame and the main frame for preventing lateral swinging movement of the auxiliary frame with respect to the main frame, and means for raising and lowering the rear end of the auxiliary frame.

10. A device of the character specified comprising a main frame carrying rear wheels, an auxiliary cultivator supporting frame arranged beneath the front end of the main frame and pivoted thereto to swing vertically, a wheel supported front axle to which the front end of the auxiliary frame is pivoted to swing laterally, draft mechanism connected with the front axle, and means in connection with the cultivator supporting frame and the main frame for preventing lateral swinging movement of the auxiliary frame with respect to the main frame.

11. A device of the character specified comprising a main frame carrying rear wheels, an auxiliary cultivator supporting frame pivoted to the front end of the main frame, a wheel supported front axle pivoted to the front end of the auxiliary frame, means in connection with the auxiliary frame and the main frame for preventing lateral swinging movement of the rear end of the auxiliary frame with respect to the main frame, and means for simultaneously swinging the rear wheels.

12. A device of the character specified comprising a main frame, a rear axle supported by the frame, spindles pivoted to the axle, wheels on the spindles, means for simultaneously swinging the wheels, an auxiliary frame carrying cultivating mechanism, a wheel carrying front axle to which the auxiliary frame is pivoted to swing laterally, and means in connection with the auxiliary frame and the main frame for preventing lateral swinging of the auxiliary frame with respect to the rear frame for the purpose specified.

13. A device of the character specified, comprising a frame carrying cultivating mechanism, a front axle pivoted to the frame to swing laterally, rear wheels pivoted to the frame to swing with respect thereto, and means for simultaneously swinging the wheels to guide the frame, and means for permitting vertical movement of the cultivating mechanism with respect to the main frame and for preventing lateral swinging movement of the cultivating mechanism with respect to the main frame.

ALONZO L. BAKER.